United States Patent [19]

Stewart

[11] 4,218,191

[45] Aug. 19, 1980

[54] MULTI-CONSTRAINT CONTROL OF A COMPRESSION SYSTEM

[75] Inventor: William S. Stewart, Bartlesville, Okla.

[73] Assignee: Phillips Petroleum Company, Bartlesville, Okla.

[21] Appl. No.: 964,327

[22] Filed: Nov. 29, 1978

[51] Int. Cl.² ............................................. F04B 49/06
[52] U.S. Cl. ...................................... 417/19; 417/20; 417/22; 417/47
[58] Field of Search ................................... 417/18–20, 417/22, 26, 46, 47

[56] References Cited

U.S. PATENT DOCUMENTS

| | | | |
|---|---|---|---|
| 3,520,133 | 7/1970 | Loft et al. | 60/39.28 |
| 3,965,674 | 6/1976 | Hobbs et al. | 60/39.39 B |
| 3,979,655 | 9/1976 | Rutshtein | 415/171 |
| 3,994,623 | 11/1976 | Rutshtein et al. | 417/47 |
| 4,102,604 | 7/1978 | Rutshtein et al. | 417/20 |
| 4,108,574 | 8/1978 | Bartley et al. | 417/20 |
| 4,142,838 | 3/1979 | Staroselsky | 417/20 |

Primary Examiner—William L. Freeh

[57] ABSTRACT

A compression system is controlled so as to maintain the actual suction pressure as close as possible to a desired suction pressure without exceeding the operational limitations of the compression system. The speed of the compression system is manipulated so as to maintain the actual suction pressure equal to a desired suction pressure if no compression system constraint is encountered. If a compression system constraint is encountered, the compression system speed is manipulated so as to operate against the particular constraint encountered without exceeding that particular constraint.

14 Claims, 1 Drawing Figure

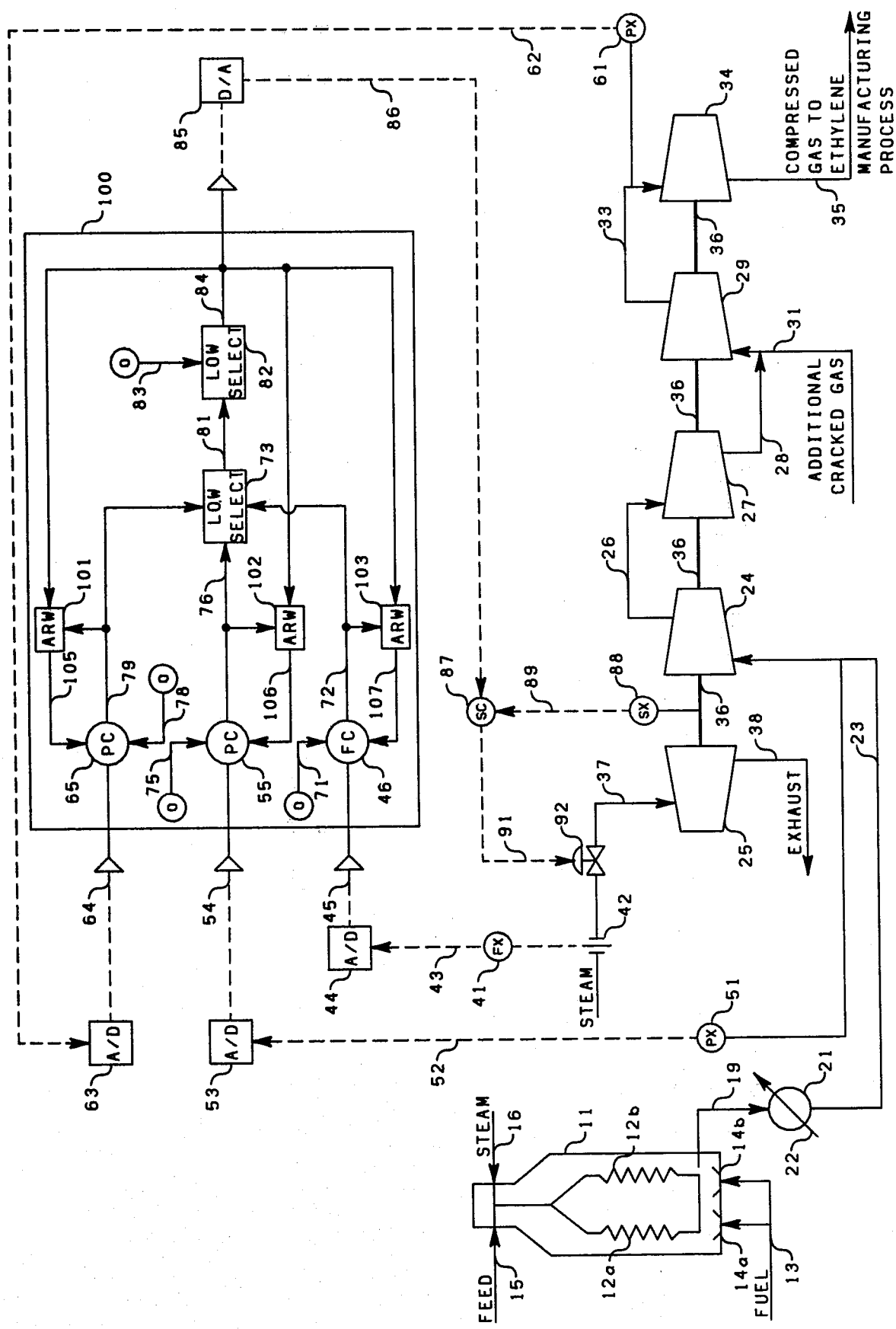

MULTI-CONSTRAINT CONTROL OF A COMPRESSION SYSTEM

This invention relates to method and apparatus for controlling a compression system. In a particular aspect this invention relates to method and apparatus for controlling a compression system so as to achieve a desired suction pressure for the compression system. In another particular aspect this invention relates to method and apparatus for controlling a compression system so as to maintain the actual suction pressure as close as possible to a desired suction pressure without exceeding the operational limitations of the compression system.

Compression systems are utilized in many processes to compress gases to be utilized in various portions of the process. In many processes where compression systems are employed, it is desirable to operate the compression system at a minimum suction pressure so as to improve the efficiency of the process. An example of this is an ethylene manufacturing process where a cracked gas compression system typically follows the pyrolysis furnace. The compression system compresses the cracked gas from the pyrolysis furnace and supplies the cracked gas to the remainder of the ethylene manufacturing process. Lowering the tube pressure in the pyrolysis furnace improves olefin yields in the ethylene manufacturing process and reduces coke formation in the pyrolysis furnace. The tube pressure can be lowered by lowering the suction pressure for the cracked gas compression system. It is thus desirable to operate the cracked gas compression system at a minimum suction pressure so as to improve the olefin yield from the pyrolysis furnace.

Because of compression system constraints, it is not always possible to operate the compression system at a minimum suction pressure. Constraints, such as boiler steam flow or turbine speed, limit the speed at which the compression system can be driven. Other constraints, such as discharge pressure, should not be exceeded if surging of the compression system is to be avoided.

It is thus an object of this invention to provide method and apparatus for controlling the compression system. It is a particular object of this invention to provide method and apparatus for controlling a compression system so as to achieve a desired suction pressure for the compression system. It is another particular object of this invention to provide method and apparatus for controlling a compression system so as to maintain the actual suction pressure as close as possible to a desired suction pressure without exceeding the operational limitations of the compression system.

In accordance with the present invention, method and apparatus is provided whereby the speed of a compression system is controlled so as to maintain the actual suction pressure for the compression system substantially equal to a desired suction pressure for the compression system. The desired suction pressure in this particular invention is a low suction pressure which causes a lowering of the tube pressure in a pyrolysis furnace associated with an ethylene manufacturing process so as to improve the olefin yield from the pyrolysis furnace.

The suction pressure for the compression system is held at a minimum value unless a compression system constraint is encountered. If a compression system constraint is encountered the speed of the compression system is manipulated so as to operate against the particular constraint encountered without exceeding the particular constraint.

In the preferred embodiment of this invention, steam is utilized to drive a turbine which drives the compressors associated with the compression system. The maximum allowable speed for the turbine and the maximum available flow rate of steam to the turbine are two of the constraints which are applicable to the compression system. A third constraint encountered is the discharge pressure for the compression system. A discharge pressure for the compression system which is too high may cause surging of the compression system which is undesirable. The compression system speed is thus manipulated so as to maintain a minimal suction pressure while not exceeding the maximum allowable speed of the turbine driving the compressors associated with the compression system, the maximum available flow rate of steam of the turbine and the maximum allowable discharge pressure for the compression system.

Other objects and advantages of the invention will be apparent from the detailed description of the invention and the appended claims as well as from the detailed description of the drawings in which FIG. 1 is an illustration of a compression system for an ethylene manufacturing process and the associated control system for the compression system.

The invention is illustrated and described in terms of a compression system which is utilized to compress the cracked gas from a pyrolysis furnace associated with an ethylene manufacturing process. The invention, however, is applicable to other manufacturing processes where it is desirable to maintain a specified suction pressure for a compression system without exceeding operational limitations of the compression system.

The invention is also described in terms of a compression system which employs four compressor stages and a single turbine driving the four compressor stages. However, the invention is also applicable to compression systems employing different numbers of compressor stages and also employing different numbers of turbines to drive the compressor stages.

The invention is described in terms of a compression system in which a steam powered turbine provides power for the compression system. The invention is also applicable to other systems for providing power to a compression system such as electrical or gas motors or fuel driven turbines.

Although the invention is illustrated and described in terms of a specific compression system and a specific control system for the compression system, the invention is also applicable to different types and configurations of compression systems as well as different types of control system configurations which accomplish the purpose of the invention. Lines designated as signal lines in the drawings are electrical in this preferred embodiment. However, the invention is also applicable to pneumatic, mechanical, hydraulic or other signal means for transmitting information. In almost all control systems some combination of these types of signals will be used. However, use of any other type of signal transmission, compatible with the process and equipment in use is within the scope of the invention.

A digital computer is used in the preferred embodiment of this invention to calculate the required control signals based on measured process parameters as well as set point supplied to the computer. Analog computers or other types of computing devices could also be used in the invention.

Controllers shown may utilize the various modes of control such as proportional, proportional-integral, proportional-derivative, or proportional-integral-derivative. In this preferred embodiment both digital and analog proportional-integral controllers are utilized. The operation of these types of controllers is well known in the art. The output control signal of a proportional-integral controller may be represented as $$S = K_1 E + K_2 S E dt$$

where
S = output control signal;
E = difference between two input signals; and
$K_1$ and $K_2$ are constants.

The various transducing means used to measure parameters which characterize the operation of the compression system and the various signals generated thereby may take a variety of forms or formats. For example, the control elements of the system can be implemented using electrical analog, digital electronic, pneumatic, hydraulic, mechanical or other similar types of equipment or combinations of one or more of such equipment types. While the presently preferred embodiment of the invention preferably utilizes a combination of pneumatic control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an eqiupment failure from being erroneously interpreted as a "low" or "high" measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, a conventional cracking furnace 11 for an ethylene manufacturing process is illustrated having two cracking tubes 12a and 12b. Heat is supplied to the two cracking tubes 12a and 12b by means of burners 14a and 14b respectively. Fuel is supplied to burners 14a and 14b through conduit means 13. The cracking furnace 11 is illustrated as having only two burners and two cracking tubes for the sake of convenience. Ordinarily, a cracking furnace used in a process such as the manufacture of ethylene will have a larger number of cracking tubes and burners. Also, in a process such as the manufacture of ethylene a plurality of cracking furnaces will commonly be utilized.

A hydrocarbon such as ethane and/or propane is provided as a feed gas to the cracking furnace 11 through conduit means 15. Steam is provided to the cracking furnace 11 through conduit means 16. The feed gas flowing through conduit means 15 and the steam flowing through conduit means 16 are combined within the cracking furnace 11 and flow through the cracking tubes 12a and 12b. After passing through the cracking tubes 12a and 12b, in which the feed gas is converted to ethylene, propylene and other gases, the gaseous mixture is combined and flows to the heat exchange means 21 through conduit means 19.

The heat exchange means 21 is provided with a cooling fluid which flows through conduit means 22. The effluent from the cracking furnace 11 is thus cooled in the heat exchange means 21 and is provided through conduit means 23 to the suction input of the compressor 24 which comprises the first stage of a four stage compression system which is driven by turbine 25. The discharge from compressor 24 is provided through conduit means 26 to the suction inlet of compressor 27. The discharge from compressor 27 is provided through conduit means 28 to the suction inlet of compressor 29. The cracked gas flowing through conduit means 28 is combined with additional cracked gas flowing through conduit means 31 before being provided to the suction inlet of compressor 29. The additional cracked gas flowing through conduit means 31 may be provided from a catalytic cracking unit or other chemical processes.

In this particular embodiment of the present invention, the additional cracked gas flowing through conduit means 31 is shown as being provided to the suction inlet of compressor 29 which is the third compressor of the four compressor stages. The additional cracked gas must be provided to a point in the compression system which has a pressure that is compatible with the pressure of the additional cracked gas flowing to conduit means 31. Thus, if the pressure seen at the suction inlet of compressor 29 was 100 psi and the pressure of the additional cracked gas flowing to conduit means 31 was 80 psi, then the additional cracked gas would have to be supplied through conduit means 31 to the suction inlet of compressor 27 rather than to the suction inlet of compressor 29.

The discharge of compressor 29 is provided through conduit means 33 to the suction inlet of compressor 34. The discharge of compressor 34 is provided through conduit means 35 to the remainder of the ethylene manufacturing process.

The four stage compression system, which is made up of compressors 24, 27, 29 and 34, is driven by turbine 25 by means of the drive shaft 36. Steam is provided to drive the turbine 25 through conduit means 37. The steam flowing through conduit means 37 flows through the turbine 25 and out of the turbine 25 through the exhaust conduit 38.

Typically, the suction pressure for compressor 24 will range from about 5 psig to about 15 psig. The discharge pressure of compressor 24 and the suction pressure of compressor 27 will range from about 25 psig to about 35 psig. The discharge pressure for compressor 28 and the suction pressure for compressor 29 will range from about 80 psig to about 110 psig. The discharge pressure of compressor 29 as well as the suction pressure of compressor 34 will range from about 200 psig to about 280 psig. The discharge pressure of compressor 34 will range from about 500 psig to about 550 psig.

The pyrolysis furnace 11 and the compression system made up of compressors 24, 27, 29 and 34 as well as turbine 25 is a conventional portion of an ethylene manufacturing process. An ethylene manufacturing process such as the C-E Lummus process which is illustrated in the November, 1977 issue of Hydrocarbon Processing at page 154 employs the pyrolysis furnace and the compression system as illustrated in FIG. 1. It is the manner in which the compression system, illustrated in FIG. 1, is controlled so as to maintain the actual suction pressure for compressor 24 as close as possible to a desired suction pressure without exceeding the operational limitations of the compression system which provides the novel features of the present invention.

Flow transducer 41 in combination with flow sensor 42 provides an output signal 43 which is representative of the flow rate of the steam flowing through conduit means 37. Signal 43 is provided from the flow transducer 41 to the analog-to-digital (A/D) converter 44. Signal 43 is converted to digital form by the A/D converter 44 and is provided as signal 45 to computer means 100. Signal 45 is particularly provided as a first input to the flow controller 46.

Pressure transducer 51, in combination with a pressure sensing device which is operably located in conduit means 23, provides an output signal 52 which is representative of the suction pressure for compressor 24. Signal 52 is provided from the pressure transducer 51 to the A/D converter 53. Signal 52 is converted from analog form to digital form by the A/D converter 53 and is provided as signal 54 to computer means 100. Signal 54 is particularly provided as a first input to the pressure controller 55.

Pressure transducer 61, in combination with a pressure sensing device which is operably located in conduit means 33, provides an output signal 62 representative of the suction pressure for compressor 34 or the discharge pressure for compressor 29. Signal 62 is provided from the pressure transducer 61 to the A/D converter 63. Signal 62 is converted from analog form to digital form by the A/D converter 63 and is provided as signal 64 to computer means 100. Signal 64 is particularly provided as a first input to the pressure controller 65. In the preferred embodiment of this invention the discharge pressure of the third stage compressor 29 is utilized as the controlling parameter to prevent surging of the four stage compressor system. The discharge pressure for compressor 34 could be utilized if desired. Because the compression ratio for compressor 34 is known, signal 62 will effectively provide an indication of what the discharge pressure from compressor 34 actually is.

Flow controller 46, pressure controller 55 and pressure controller 65 are digital implementations of proportional-integral controllers. The form of the output from such controllers has been previously set forth. Flow controller 46 is provided with a set point signal 71 which is representative of the maximum possible steam flow through conduit means 37 to the turbine 25. In response to signals 45 and 71, the flow controller 46 provides an output signal 72 which is responsive to the difference between signals 45 and 71. Signal 72 is provided from the flow controller 46 as a first input to the low select block 73.

The pressure controller 55 is provided with a set point signal 75 which is representative of the minimum allowable suction pressure for compressor 24. In response to signals 75 and 54, the pressure controller 55 provides an output signal 76 which is responsive to the difference between signals 54 and 75. Signal 76 is provided as a second input to the low select block 73.

Pressure controller 65 is provided with a set point signal 78 which is representative of the maximum allowable discharge pressure for compressor 29. In response to signals 64 and 78, the pressure controller 65 provides an output signal 79 which is responsive to the difference between signals 64 and 78. Signal 79 is provided as a third input to the low select block 73.

The lowest of signals 72, 76 and 79 is selected by the low select block 73 and is provided as signal 81 from the low select block 73 to the low select block 82. The low select block 82 is also provided with a set point signal 83 which is representative of the maximum allowable speed for turbine 25. The lower of signals 81 and 83 is selected by the low select block 82 and is provided as signal 84, which is representative of the desired speed for the turbine 25, from the low select block. Signal 84 is provided as the controlling output signal from computer means 100 and is particularly provided to the D/A converter 85. Signal 84 is converted from digital form to analog form by the D/A converter 85 and is provided as signal 86 from the D/A converter 85 to the speed controller 87.

Speed transducer 88, in combination with a speed sensing device such as a tachometer which is operably connected to shaft 36, provides an output signal 89 which is representative of the actual speed of the shaft 36. Signal 89 is provided from the speed transducer 88 as a second input to the speed controller 87. In response to signals 86 and 89, the speed controller 87 provides an output signal 91 which is responsive to the difference between signals 86 and 89. Signal 91 is provided from the speed controller 87 as a control signal to the pneumatic control valve 92 which is operably located in conduit means 37. The pneumatic control valve 92 is manipulated in response to signal 91 to thereby maintain the flow rate of steam through conduit means 37 at a desired level.

The control system of the present invention is preferably set up so as to cause a decrease in the speed of turbine 25 in response to a decrease in the signal level of signal 86. A decrease in the speed of turbine 25 results in a decrease in the discharge pressure of compressor 29, an increase in the suction pressure of compressor 24, a relaxation in the steam flow requirements through conduit means 37 and, of course, a reduction in the rotational speed of shaft 36.

The output of pressure controller 55 will usually be the controlling output for the four stage compression system illustrated in FIG. 1. The output signal 76 from the pressure controller 55 is scaled so as to be substantially in the middle of the signal range for signal 76 when signal 54 is substantially equal to signal 75. Thus, if signal 76 can range from a binary value of 0 to a binary value of 8, signal 76 will have approximately a binary value of 4 when signal 54 is substantially equal to signal 75 which is preferably set to equal about 6 psig.

If the output signal 79 from the pressure controller 65 may also range from a binary value of 0 to a binary value of 8, then signal 79 is preferably also scaled to be substantially equal to a binary value of 4 when signal 64 is substantially equal to the set point signal 78. The set point signal 78 will generally have a value which is representative of approximately 260 psig in this preferred embodiment. If signal 64 approaches 260 psig, then the binary value of signal 79 will approach 4. If signal 64 exceeds a value of approximately 260 psig, then the binary value of signal 79 will go to a binary number lower than 4. Thus, if signal 64 exceeds the value of the set point signal 78, signal 79 will be selected as the controlling output from computer means 100 and will be utilized to slow down the turbine 25 so as to decrease the discharge pressure from compressor 29 until signal 64 is again equal to or less than the pressure represented by signal 78.

In like manner the output signal 72 from the flow controller 46 is preferably scaled so as to have a binary value of approximately 4 if the actual steam flow through conduit means 37 which is represented by signal 45 is approximately equal to the maximum possible steam flow represented by the set point signal 71. If signal 45 indicates that the steam flow demanded is exceeding the maximum possible steam flow then signal 72 will assume a binary value which is less than 4 which will allow signal 72 to be selected as the controlling signal from the computer means 100. Pneumatic control valve 92 will effectively be closed more fully in response to signal 72 which will result in a decrease in the steam flow through conduit means 37.

The set point signal 83, which is representative of the maximum shaft speed allowable for the turbine 25, will be set according to the manufacturer's specifications. A typical maximum speed for a turbine in an ethylene plant compression system is 3750 RPMs. Whatever the maximum turbine speed is, the set point signal 83 will be set such that, if signal 83 is selected, the pneumatic control valve 92 will be manipulated so as to maintain the rotational speed of shaft 36 either equal to or slightly below the maximum specified shaft speed for the turbine 25. This is accomplished by setting the set point signal 83 equal to a binary number such as 6. Thus, the output signal 84 can never go below the set point signal 83 and the specified maximum shaft speed for the turbine 25 cannot be exceeded.

The control system thus operates to generally select signal 76 as the output control signal from computer means 100. Signal 76 is utilized to maintain the suction pressure for the compressor 24 at the minimum level represented by the set point signal 75. This results in improved olefin conversion in the pyrolysis furnace 11 and a reduced coke formation. If some compressor constraint is exceeded, then signal 76 will no longer be selected as the output control signal from computer means 100 but rather either signal 79, 72 or 83 will be selected as the control signal. In this manner, the control system operates to maintain a minimum suction pressure for compressor 24 unless some compression system constraint is encountered in which case the control system operates to insure that the compression system constraint is not exceeded.

Reset windup is a well known pnenomena which occurs when a plurality of controllers are utilized in conjunction with a low select such that the output of only one of the controllers is actually being utilized as the control signal. The integral term of the output of the controllers which are not selected will continue to increase or "wind up" until the output of the particular controller has reached the maximum output signal possible. This is very undesirable because the control signal of the controller which has "wound up" is not representative of the desired control action when the respective controller becomes active again. A plurality of systems are well known in the art for controlling reset windup. The anti-reset windup blocks 101, 102 and 103 are utilized in the present invention to prevent reset windup.

The output signal 79 from the pressure controller 65 is provided as a first input to the anti-reset windup block 101. In like manner the output signal 76 from the pressure controller 55 is provided as an input to the anti-reset windup block 102 and the output signal 72 from the flow controller 46 is provided as an input to the anti-reset windup block 103. The output signal 84 from the low select block 82 is provided as an input to each of the anti-reset windup blocks 101, 102 and 103. In response to signals 79 and 84, the anti-reset windup block provides and output signal 105 which is provided to the pressure controller 65 and is utilized to prevent reset windup. In response to signals 76 and 84 the anti-reset windup block provides an output signal 106 which is provided to the pressure controller 55 and is utilized to prevent reset windup for the pressure controller 55. In response to the output signal 72 and 84, the anti-reset windup block 103 provides an output signal 107 which is provided to the flow controller 46 and is utilized to prevent reset windup for the flow controller 46.

The controllers periodically calculate a value for the output signals from the controllers. Each calculation is based on the previous value output from the controller. Generally then, the output from the controller would be fed back to the controller to be used in calculating the next value to be output from the controller. The anti-reset windup blocks 101, 102 and 103 may be considered to be essentially memories in which the output from the controller is stored and the output from the low select 82 is stored. The output from the low select 82 is utilized to replace the output from the controller if the output from the particular controller has not been selected as the output from the low select 82. The output from the low select 82 is thus fed back to each controller and in this manner the next output from the controller is based on the output from the low select 82 and is not based on the previous output from the particular controller. In this manner reset windup of the controllers is prevented.

The invention has been described in terms of a preferred embodiment as illustrated in FIG. 1. Specific components used in the practice of the invention, as illustrated in FIG. 1, such as pressure transducers 51 and 61; flow transducer 41; flow sensor 42; speed controller 87; speed transducer 88; and pneumatic control valve 92 are each well known, commercially available control components such as are described at length in Perry's Chemical Engineers' Handbook, 4th Edition, Chapter 22, McGraw-Hill.

Other compenents not previously specified are as follows:
    A/D converters 44, 53 and 63
        MM5357 8-bit A/D converter
        National Semiconductor
    Digital-to-analog converter 85
        A/D 559 8-bit D/A converter
        Analog Devices
    Computer means 100
        DEC-PDP-11/70
        DEC For reasons of brevity, conventional auxiliary fractionation equipment such as pumps, heat exchangers, additional measurement-control devices, etc, have not been included in the above description as they play no part in the explanation of the invention.

While the invention has been described in terms of the presently preferred embodiment, reasonable variations and modifications are possible by those skilled in the art, within the scope of the described invention and the appended claims. Variations such as using an analog computer to perform the required calculations is within the scope of the invention. Also variations such as increasing or decreasing the number of compressor stages is within the scope of the invention.

That which is claimed is:

1. Apparatus comprising:
a compression system having at least one compressor means, said compression system having a suction inlet and a discharge outlet;
means for driving said compression system;
means for establishing a first signal representative of the suction pressure at the suction inlet of said compression system;
means for establishing a second signal representative of the desired suction pressure at the suction inlet of said compression system;
means for comparing said first signal and said second signal and for establishing a third signal responsive to the difference between said first signal and said second signal;
means for establishing a fourth signal representative of the discharge pressure at the discharge outlet of said compression system;
means for establishing a fifth signal representative of the highest allowable discharge pressure at the discharge outlet of said compression system;
means for comparing said fourth signal and said fifth signal and for establishing a sixth signal responsive to the difference between said fourth signal and said fifth signal; and
means for manipulating the speed of said means for driving said compression system in response to said third signal if the pressure represented by said fourth signal is less than the pressure represented by said fifth signal and for manipulating the speed of said means for driving said compression system in response to said sixth signal if the pressure represented by said fourth signal is greater than the pressure represented by said fifth signal.

2. Apparatus in accordance with claim 1 wherein said means for driving said compression system comprises a turbine means to which a drive fluid is supplied through a first conduit means, said turbine means being connected to said compression system by a drive shaft means.

3. Apparatus in accordance with claim 2 wherein said means for manipulating the speed of said means for driving said compression system in response to said third signal if the pressure represented by said fourth signal is less than the pressure represented by said fifth signal and for manipulating the speed of said means for driving said compression system in response to said sixth signal if the pressure represented by said fourth signal is greater than the pressure represented by said fifth signal comprises:
a first low select means having at least first and second inputs and at least one output;
means for supplying said third signal to the first input of said first low select means;
means for supplying said sixth signal to the second input of said first low select means, the lower of said third and sixth signals being supplied as a seventh signal from the at least one output of said first low select means;
means for establishing an eighth signal representative of the actual rotational speed of said drive shaft means;
means for comparing said seventh signal and said eighth signal and for establishing a ninth signal responsive to the difference between said seventh signal and said eighth signal; and
means for manipulating the flow rate of said drive fluid through said first conduit means in response to said ninth signal.

4. Apparatus in accordance with claim 3 additionally comprising:
means for establishing a tenth signal representative of the maximum allowable rotational speed for said drive shaft means; and
means for manipulating the flow rate of said drive fluid through said first conduit means in response to said tenth signal, so as to prevent the rotational speed of said drive shaft means from exceeding the maximum allowable rotational speed represented by said tenth signal, if the flow rate of said drive fluid represented by said seventh signal would cause the maximum rotational speed of said drive shaft means as represented by said tenth signal to be exceeded.

5. Apparatus in accordance with claim 4 wherein said means for manipulating the flow rate of said drive fluid through said first conduit means in response to said tenth signal, so as to prevent the rotational speed of said drive shaft means from exceeding the maximum allowable rotational speed represented by said tenth signal, if the flow rate of said drive fluid represented by said seventh signal would cause the maximum rotational speed of said drive shaft means as represented by said tenth signal to be exceeded comprises:
a second low select means having at least first and second inputs and at least one output;
means for supplying said seventh signal to the first input of said second low select means;
means for supplying said tenth signal to the second input of said second low select means, said second low select means supplying the lower of said seventh and tenth signals as an output from at least one output of said second low select means, said tenth signal being selected as an output from said second low select means only when said seventh signal is representative of a flow rate of said drive fluid through said first conduit means which would cause the rotational speed of said drive shaft means to exceed the maximum rotational speed for said drive shaft means as represented by said tenth signal.

6. Apparatus in accordance with claim 5 additionally comprising:
means for establishing an eleventh signal representative of the flow rate of said drive fluid through said first conduit means;
means for establishing a twelfth signal representative of the maximum possible flow rate of said drive fluid through said first conduit means;

means for comparing said eleventh signal and said twelfth signal and for establishing a thirteenth signal responsive to the difference between said eleventh signal and said twelfth signal;

means for supplying said thirteenth signal to a third input of said first low select means, said thirteenth signal being selected as said seventh signal if said thirteenth signal is lower than said third signal and said sixth signal.

7. Apparatus in accordance with claim 1 wherein said compression system comprises four compressor means in series with the suction inlet of each compressor means being operably connected to the discharge outlet of the preceding compressor means, said shaft means being operably connected to each of said four compressor means.

8. Apparatus in accordance with claim 7 additionally comprising:

a cracking furnace means;

means for supplying a feed stream to said cracking furnace means;

means for supplying a diluent fluid to said cracking furnace means, said diluent fluid being combined with said feed stream;

means for supplying a fuel to said cracking furnace means, the combustion of said fuel supplying heat to said cracking furnace means; and means for removing a gaseous mixture, containing the cracked components of said feed stream and containing said diluent fluid, from said cracking furnace and for supplying said gaseous mixture to the suction inlet of the first one of said four compressor means in said compressor system.

9. A method for controlling a compression system comprising:

establishing a first signal representative of the suction pressure at the suction inlet of said compression system;

establishing a second signal representative of the lowest allowable suction pressure at the suction inlet of said compression system;

comparing said first signal and said second signal and establishing a third signal responsive to the difference between said first signal and said second signal;

establishing a fourth signal representative of the discharge pressure at the discharge outlet of said compression system;

establishing a fifth signal representative of the highest allowable discharge pressure at the discharge outlet of said compression system;

comparing said fourth signal and said fifth signal and establishing a sixth signal responsive to the difference between said fourth signal and said fifth signal;

manipulating the speed of said compression system in response to said third signal if the pressure represented by said fourth signal is less than the pressure represented by said fifth signal; and manipulating the speed of said compression system in response to said sixth signal if the pressure represented by said fourth signal is greater than the pressure represented by said fifth signal.

10. A method in accordance with claim 9 wherein said step of manipulating the speed of said compression system in response to said third signal if the pressure represented by said fourth signal is less than the pressure represented by said fifth signal and said step of manipulating the speed of said compression system in response to said sixth signal if the pressure represented by said fourth signal is greater than the pressure represented by said fifth signal comprises:

establishing a seventh signal representative of the lower of said third and sixth signals;

establishing an eighth signal representative of the speed of said compression system;

comparing said seventh signal and said eighth signal and establishing a ninth signal responsive to the difference between said seventh signal and said eighth signal; and manipulating the speed of said compression system in response to said ninth signal.

11. A method in accordance with claim 9 additionally comprising the steps of:

establishing a tenth signal representative of the maximum allowable speed of said compression system; and manipulating the speed of said compression system in response to said tenth signal so as to prevent the actual speed of said compression system from exceeding the maximum allowable speed represented by said tenth signal if the speed of said compression system represented by said seventh signal would cause the maximum speed of said compression system as represented by said tenth signal to be exceeded.

12. A method in accordance with claim 11 additionally comprising the steps of:

supplying a feed stream to a cracking furnace means;

supplying a diluent fluid to said cracking furnace means, said diluent fluid being combined with said feed stream;

supplying a fuel to said cracking furnace means, the combustion of said fuel supplying heat to said cracking furnace means; and removing a gaseous mixture, containing the cracked components of said feed stream and containing said diluent fluid, from said cracking furnace means and supplying said gaseous mixture to the suction inlet of said compression system.

13. A method in accordance with claim 9 wherein said step of manipulating the speed of said compression system in response to said tenth signal so as to prevent the actual speed of said compression system from exceeding the maximum allowable speed of said compression system represented by said tenth signal if the speed of said compression system represented by said seventh signal would cause the maximum speed of said compression system as represented by said tenth signal to be exceeded comprises selecting the lower of said seventh and tenth signals, said tenth signal being selected only when said seventh signal is representative of a speed of said compression system which would cause the speed of said compression system to exceed the maximum speed of said compression system as represented by said tenth signal.

14. A method in accordance with claim 10 additionally comprising the steps of:

establishing an eleventh signal representative of the flow rate of a drive fluid to said compression system;

establishing a twelfth signal representative of the maximum possible flow rate of said drive fluid to said compression means;

comparing said eleventh signal and said twelfth signal and establishing a thirteenth signal responsive to the difference between said eleventh signal and said twelfth signal; and selecting said thirteenth signal as said seventh signal if said thirteenth signal is lower than said third signal and said sixth signal.

* * * * *